United States Patent
Sasaki

(10) Patent No.: US 8,559,710 B2
(45) Date of Patent: Oct. 15, 2013

(54) COLOR PROCESSING APPARATUS AND METHOD THEREOF FOR COLOR CONVERSION USING AMBIENT LIGHT PARAMETER

(75) Inventor: Yoshitaka Sasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1211 days.

(21) Appl. No.: 12/203,289

(22) Filed: Sep. 3, 2008

(65) Prior Publication Data

US 2009/0067711 A1    Mar. 12, 2009

(30) Foreign Application Priority Data

Sep. 12, 2007 (JP) ................. 2007-237261

(51) Int. Cl.
*G06K 9/00* (2006.01)
(52) U.S. Cl.
USPC .......................................... 382/167; 382/162
(58) Field of Classification Search
None
See application file for complete search history.

(56) References Cited

U.S. PATENT DOCUMENTS

| | | | | |
|---|---|---|---|---|
| 6,678,407 B1 * | 1/2004 | Tajima | ............ | 382/167 |
| 6,788,812 B1 * | 9/2004 | Wilkins | ............ | 382/167 |
| 7,580,063 B2 * | 8/2009 | Makioka | ............ | 348/231.3 |
| 2002/0118294 A1 * | 8/2002 | Takano et al. | ............ | 348/370 |
| 2002/0196972 A1 * | 12/2002 | Bayramoglu et al. | ........ | 382/167 |
| 2003/0063799 A1 * | 4/2003 | Choi et al. | ............ | 382/167 |
| 2007/0065006 A1 * | 3/2007 | Wilensky | ............ | 382/167 |
| 2008/0239348 A1 * | 10/2008 | Kawai | ............ | 358/1.9 |
| 2008/0279451 A1 * | 11/2008 | Shimbaru | ............ | 382/167 |
| 2008/0303918 A1 * | 12/2008 | Keithley | ............ | 348/223.1 |

FOREIGN PATENT DOCUMENTS

JP       2003283851 A  * 10/2003

OTHER PUBLICATIONS

English translation of JP 2003283851, Oct. 2003.*

* cited by examiner

*Primary Examiner* — Li Liu
(74) *Attorney, Agent, or Firm* — Fitzpatrick, Cella, Harper & Scinto

(57) ABSTRACT

Color processing is performed for an image such that more preferable color representation can be obtained under viewing environments having different viewing conditions. Hence, a setting unit inputs a plurality of viewing conditions of the output side of an image. A calculation unit sets a viewing condition used to calculate an ambient light parameter, based on the plurality of viewing conditions, and calculates an ambient light parameter based on the set viewing condition. A conversion unit performs inverse conversion of a color appearance model to color data by using the ambient light parameter.

4 Claims, 8 Drawing Sheets

F I G. 9
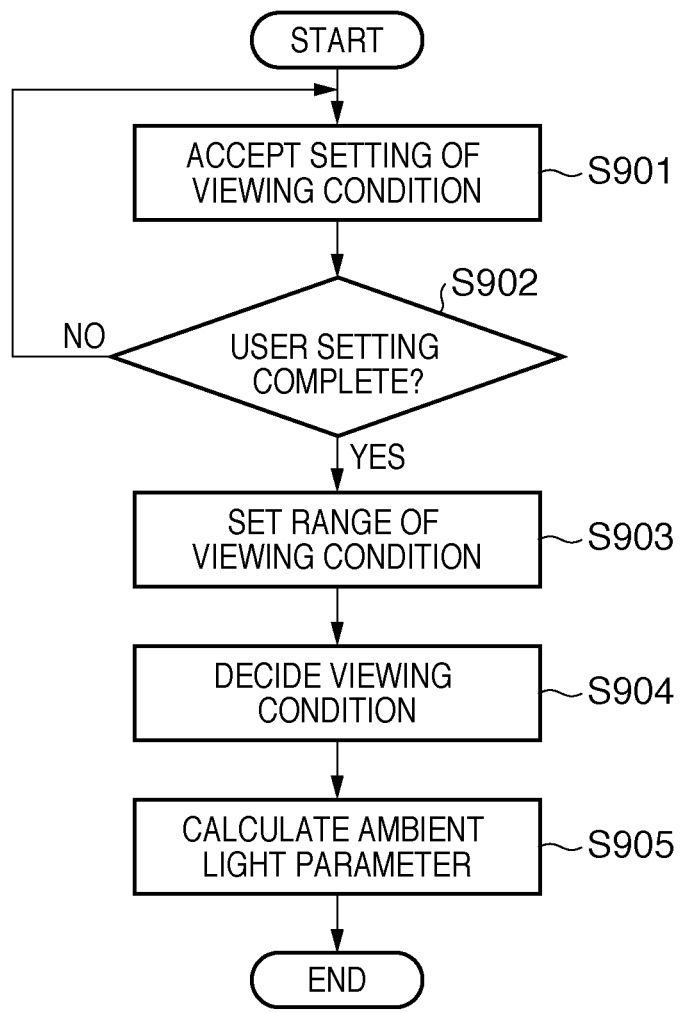

COLOR PROCESSING APPARATUS AND METHOD THEREOF FOR COLOR CONVERSION USING AMBIENT LIGHT PARAMETER

BACKGROUND OF THE INVENTION

1. Field of the Invention

The present invention relates to color processing according to the viewing conditions of an image.

2. Description of the Related Art

Along with the prevalence of devices which handle color images, opportunities to display an image captured by a digital camera on a color monitor or print such an image by a color printer have increased. In this case, since the range of representable colors (to be referred to as a color gamut, hereinafter) differs in each device that handles color images, color processing for absorbing the differences between the color gamuts of devices is necessary. This color processing is performed in a device-independent color space such as a CIELab color space. Recently, however, the color appearance space of a color appearance model (e.g., CIECAM02) that models the human visual characteristics with a higher accuracy than conventional color spaces is beginning to be utilized.

A color appearance model (CAM, hereinafter) converts a CIEXYZ value into a color value of a color appearance space by using an ambient light parameter according to the viewing condition of a color image. The viewing condition includes the color temperature and intensity of illumination of the light source of an environment in which a color image is viewed. Based on the measurement data of the light source or the like, the CIEXYZ value or adaptation luminance of a white point as an ambient light parameter of the CAM is calculated. That is, in order to obtain a color image most suitable for a specific viewing environment in which the image is viewed, color processing is performed by setting an accurate ambient light parameter according to that viewing condition.

However, since an image printed by a color printer, a mobile PC, or the like can be portable, a color image is not always viewed in the viewing environment corresponding to the ambient light parameter of color processing. In other words, a color image is often viewed in various environments with different types of light sources such as indoor and outdoor or a fluorescent light and an incandescent light. Therefore, even when a color image which underwent color processing based on the ambient light parameter adapted to a specific viewing environment is printed or displayed, the original color of the color image is not represented in an environment having a different viewing condition.

SUMMARY OF THE INVENTION

In one aspect, a color processing apparatus comprises: an inputting section, arranged to input a plurality of viewing conditions of an output side of an image; a setting section, arranged to set a viewing condition used to calculate an ambient light parameter, based on the plurality of viewing conditions; a calculator, arranged to calculate an ambient light parameter based on the set viewing condition; and a color processor, arranged to perform conversion of color data by using the ambient light parameter.

In another aspect, a color processing apparatus comprises: an inputting section, arranged to input a range of a viewing condition of an output side of an image; a setting section, arranged to set a viewing condition used to calculate an ambient light parameter, based on the range of the viewing condition; a calculator, arranged to calculate an ambient light parameter based on the set viewing condition; and a color processor, arranged to perform conversion of color data by using the ambient light parameter.

According to these aspects, it is possible to perform color processing of an image such that more preferable color representation can be obtained under viewing environments having different viewing conditions.

Further features of the present invention will become apparent from the following description of exemplary embodiments with reference to the attached drawings.

BRIEF DESCRIPTION OF THE DRAWINGS

FIG. 9 is a flowchart for explaining the setting of viewing condition;

DESCRIPTION OF THE EMBODIMENTS

Color processing of embodiments according to the present invention will now be described in detail with reference to the accompanying drawings.

First Embodiment

[Arrangement of Apparatus]

Figure 1:
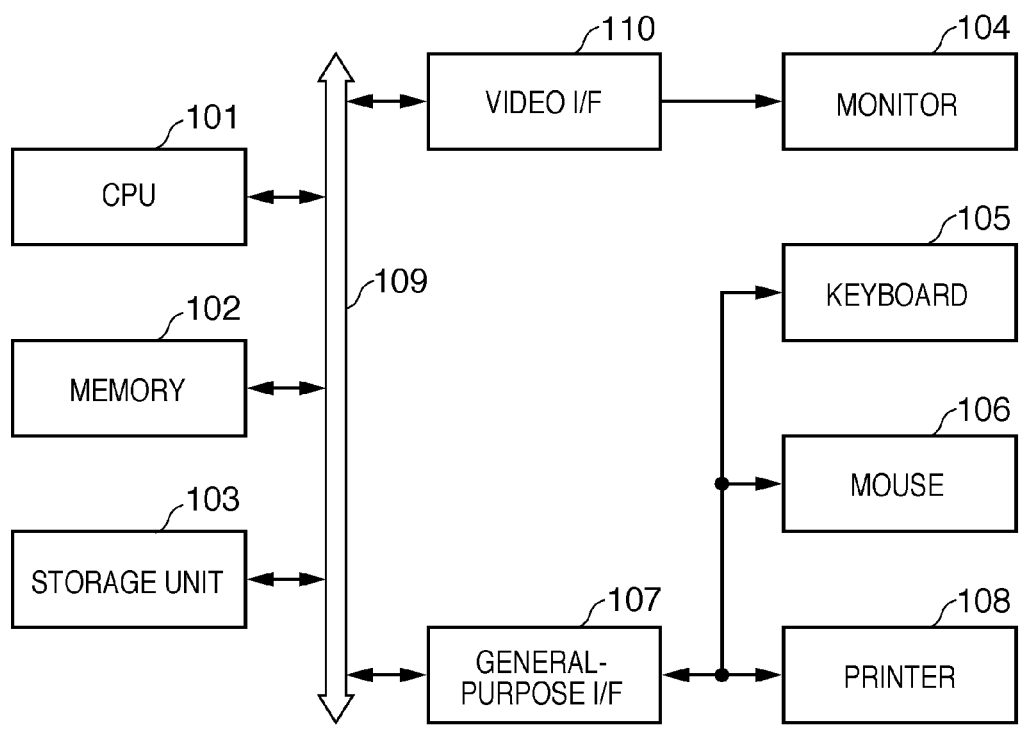
FIG. 1 is a block diagram showing the arrangement of an image processing apparatus of embodiments.

FIG. 1 is a block diagram showing the arrangement of an image processing apparatus of the embodiments.

A CPU 101 controls the overall apparatus by using a memory 102 such as a RAM as a work area and executing an operating system (OS) and a program for various processing including image processing to be described later, which are stored in a storage unit 103 such as a ROM or hard disk drive. The storage unit 103 stores not only the OS and program but also a color image or various types of data. The CPU 101 displays a user interface (UI), color image, or various types of data on a monitor 104 via a video interface (I/F) 110.

A general-purpose interface (I/F) 107 is an interface for a serial bus such as, e.g., a USB (Universal Serial Bus) or IEEE1394, to which various types of devices can be connected. A keyboard 105, a mouse 106, a printer 108 for printing a color image, and the like are connected to the general-purpose I/F 107. An image input device such as a scanner or digital camera, a storage device such as a hard disk or USB memory, or a disk drive of pertinent type may also be connected to the serial bus. The above-described components are connected to each other via a system bus 109.

[Image Processing]

Figure 2:
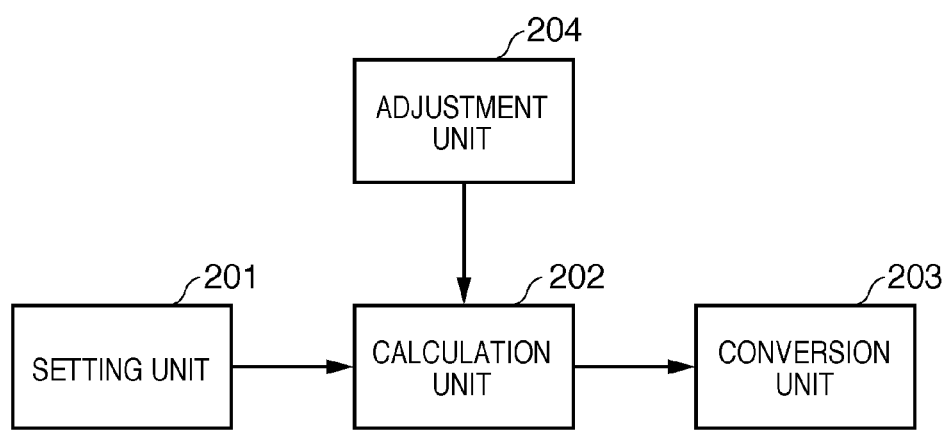
FIG. 2 is a functional block diagram showing an outline of the image processing performed by a CPU.

FIG. 2 is a functional block diagram showing an outline of the image processing performed by the CPU 101.

A user manipulates a setting unit 201 to set a plurality of viewing conditions upon viewing a color image. A calculation unit 202 calculates an ambient light parameter based on the plurality of viewing conditions set by the user. A conversion unit 203 performs conversion (color processing) of the color of the color image based on the calculated ambient light parameter. An adjustment unit 204 adjusts the calculation condition of the ambient light parameter used by the calculation unit 202.

Figure 3:
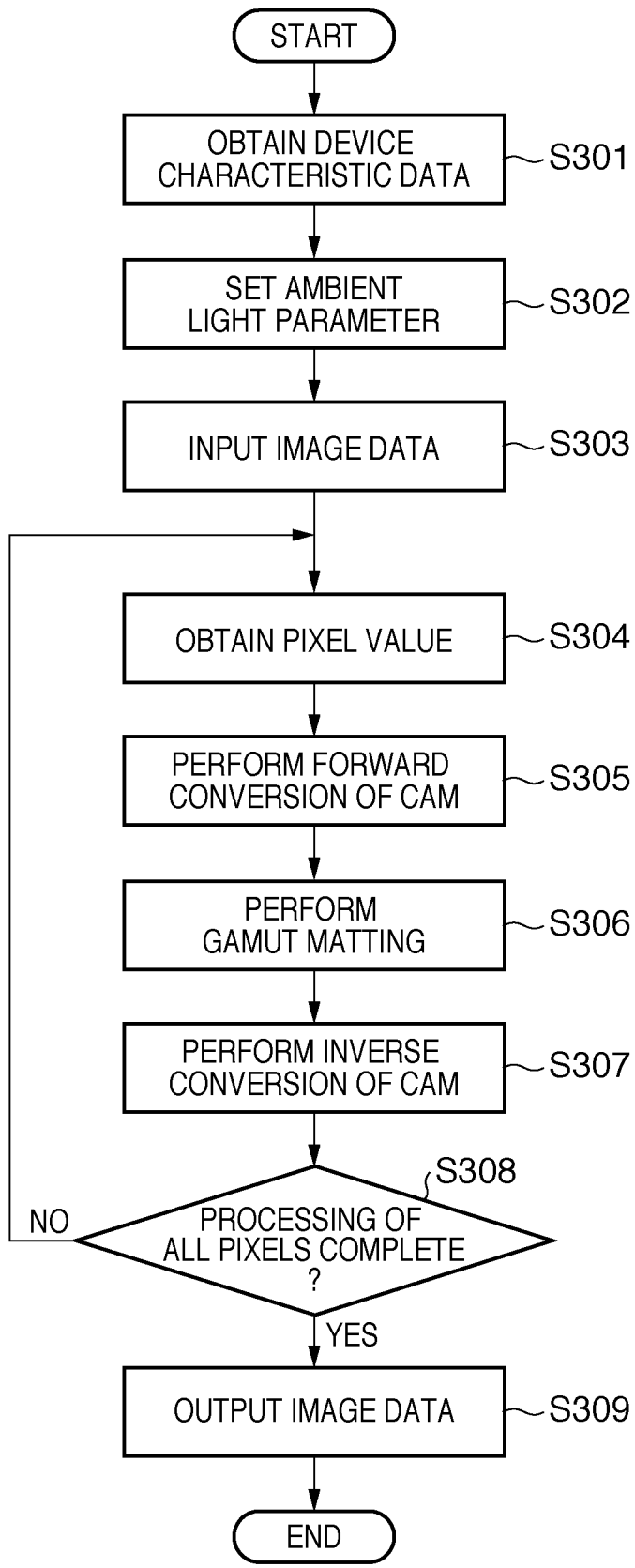
FIG. 3 is a flowchart for explaining the image processing performed by the CPU.

FIG. 3 is a flowchart for explaining the image processing performed by the CPU 101. Note that the following description exemplifies a case in which image data on an sRGB space undergoes color processing to obtain image data on the device space of the inkjet printer 108. The source of image data is, for example, a digital camera or scanner. The output destination of image data is not limited to an inkjet printer, but may be a monitor or an electrophotographic printer.

First, the CPU 101 obtains the device characteristic data of input and output devices (S301). For example, in case of image data on an sRGB space, a defined conversion formula is stored in the storage unit 103 in advance as device characteristic data, and a device profile is stored in the storage unit 103 in advance as the device characteristic data of the printer 108. Alternatively, the color measurement result (calorimetric value) of each patch of a predetermined color chart printed by the printer 108 may be obtained to generate the device characteristic data.

As for the device characteristic data, for example, a uniform 9×9×9 grid is set in an RGB space in which each of R, G, and B is represented by 8-bit data. The device characteristic data can be represented as a three-dimensional lookup table (3DLUT) which describes the correspondence between the color signal values (RGB values) and the measurement values (XYZ values) of 729 grid points described below. Note that the number of grid points is not particularly limited, and any number of grid points can be set.

(R,G,B)=(0,0,0), (0,0,32), (0,0,64), . . . , (0,0,224), (0,0, 255), . . . , (0,32,0), (0,32,32), . . . , (255,255,224), (255,255, 255)

The CPU 101 sets an ambient light parameter corresponding to each of the input and output sides, based on the viewing condition set by the user using the setting unit 201 or the viewing condition upon measurement by a calorimeter connected to the general-purpose I/F 107 (S302). This step will be described in detail later.

The CPU 101 inputs image data to undergo color processing from the image input device, storage device, or disk drive (S303), and obtains a pixel value (color signal value) of the image data in the raster scan order (S304). The CPU 101 then converts the obtained color signal value (the RGB value on the sRGB space) into a color signal value (Jab value, color data) on a color appearance space (e.g., CIECAM02) (forward conversion of the CAM) (S305). At this time, the CPU 101 converts the RGB value into an XYZ value by the conversion formula as the device characteristic data. The CPU 101 then converts the XYZ value into a Jab value (input point) by a predetermined conversion formula with the ambient light parameter of the input side applied thereto. For example, when each of the R, G, and B color signals is normalized, conversion from an RGB value into a CIEXYZ value is expressed by:

if R, G, and B≤0.03928, $$Rs = R/12.92$$

$$Gs = G/12.92$$

$$Bs = B/12.92$$

if R, G, and B>0.03928, $$Rs = \{(R+0.055)/1.055\}^{2.4}$$

$$Gs = \{(G+0.055)/1.055\}^{2.4}$$

$$Bs = \{(B+0.055)/1.055\}^{2.4} \quad (1)$$

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} Rs \\ Gs \\ Bs \end{bmatrix} \quad (2)$$

The CPU 101 performs gamut mapping to absorb the differences between the color gamut (the input gamut, hereinafter) of the input device and the color gamut (the output gamut, hereinafter) of the output device (S306). Various methods for gamut mapping have been proposed, and a user can use a desired gamut mapping method. For example, a method of minimizing the difference between the colors before and after the gamut mapping, a method of setting a point on an achromatic axis, e.g., (J,a,b)=(50,0,0), as a focal point (convergence point) and mapping an input point within the output gamut onto a line connecting the focal point and input point, and the like are known well.

The CPU 101 converts the Jab value into a color signal value (RGB value) of the printer 108, based on the device characteristic data of the printer 108 and the ambient light parameter of the output side (inverse conversion of the CAM) (S307). At this time, the CPU 101 converts the Jab value into an XYZ value by a predetermined conversion formula with the ambient light parameter of the output side applied thereto. The CPU 101 then converts the XYZ value into a device RGB value based on the device characteristic data which describes the correspondence between the device RGB value of the printer 108 and the XYZ value. Note that conversion from an XYZ value into a device RGB value is performed by the following method. That is, the output device characteristic data (RGB value to XYZ value) are searched for four grid points which surround the target XYZ value by the quasi-Newton method or the like. The device RGB value is calculated from the relationship between the RGB value and XYZ value of the found points by tetrahedron interpolation or the like.

The CPU 101 determines whether all pixels of the input image data have undergone the color conversion (S308), and repeats the processing from steps S304 to S307 until all the pixels undergo the color conversion. When all the pixels have undergone the color conversion, the CPU 101 outputs the image data obtained as the result of the color conversion to the printer 108 via the general-purpose I/F 107 (S309), thus ending the process.

Setting of Ambient Light Parameter

Figure 4:
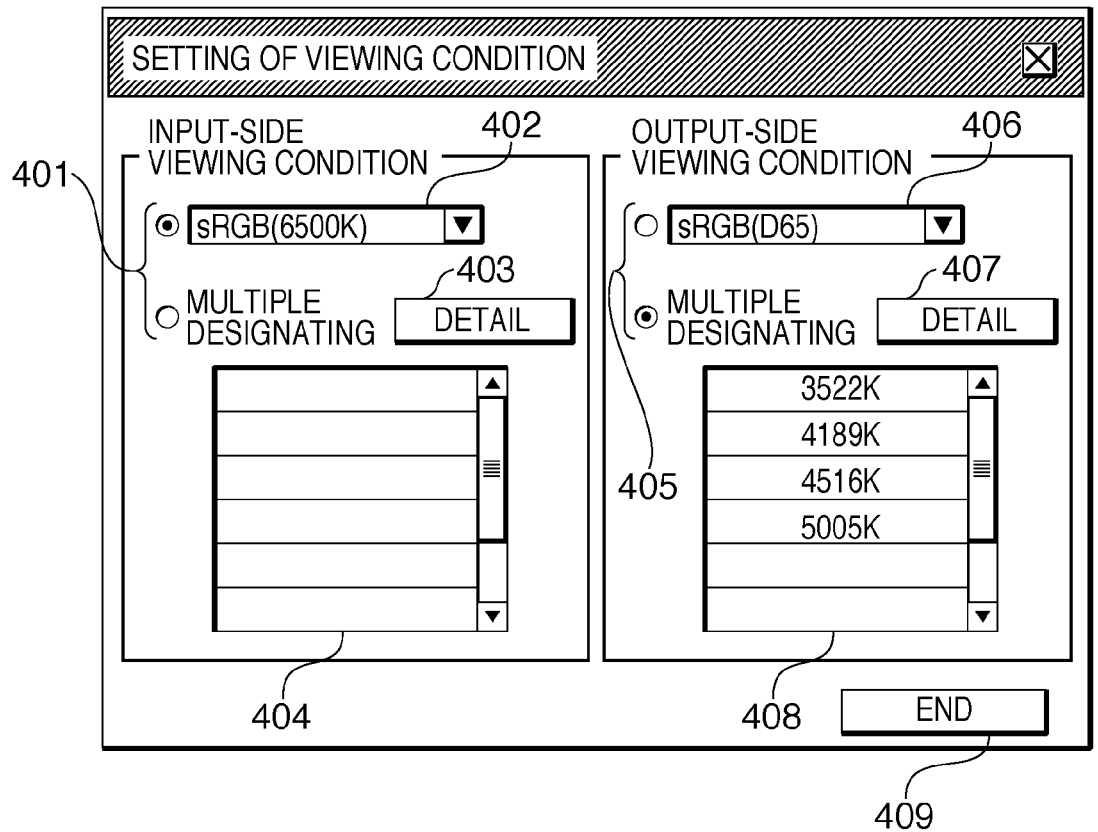
FIGS. 4 and 5 are views showing examples of UIs for setting viewing conditions.
Figure 5:
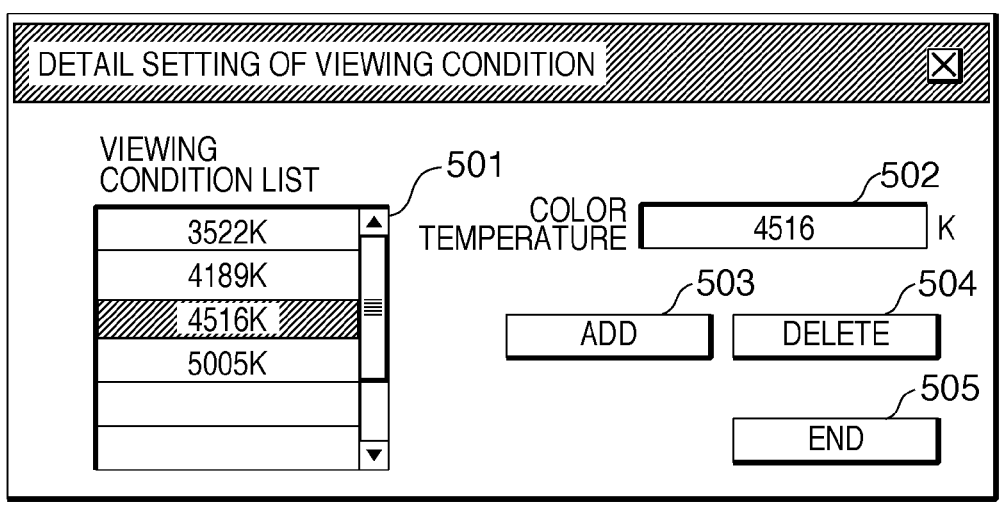

FIGS. 4 and 5 show examples of UIs for setting viewing conditions. Note that although a color temperature is set as a viewing condition in this embodiment, a predetermined viewing condition about the light source of the viewing environment, such as the intensity of illumination or chromaticity, can also be set.

FIG. 4 shows an example of a window for setting an input-side viewing condition and an output-side viewing condition, which are displayed first upon setting ambient light parameters (S302).

A user selects the setting method of input-side viewing condition using a radio button 401. When the upper radio button is selected, a combo box 402 for selecting a preset input-side viewing condition such as sRGB becomes operative. When the lower radio button is selected, a detail setting button 403 for calling a detail setting window used to set a plurality of input-side viewing conditions becomes operative. The set input-side viewing conditions are displayed in a list box 404.

The user then selects the setting method of output-side viewing condition using a radio button 405. When the upper radio button is selected, a combo box 406 for selecting a preset output-side viewing condition such as sRGB becomes operative. When the lower radio button is selected, a detail setting button 407 for calling a detail setting window used to set a plurality of output-side viewing conditions becomes operative. The set output-side viewing conditions are displayed in a list box 408.

When ending the setting of viewing conditions, the user presses an end button 409.

FIG. 5 shows an example of the detail setting window of viewing condition displayed when the detail setting button 403 or 407 is pressed.

A list box 501 displays a viewing condition which has been already set. The user inputs a viewing condition in a text box 502 and presses an add button 503 to additionally set it. Alternatively, the user selects a viewing condition from the list box 501 and presses a delete button 504 to delete it. When the detail setting is complete, the user presses an end button 505. Of course, when the end button 505 is pressed, the UI shown in FIG. 4 becomes operative.

Figure 6:
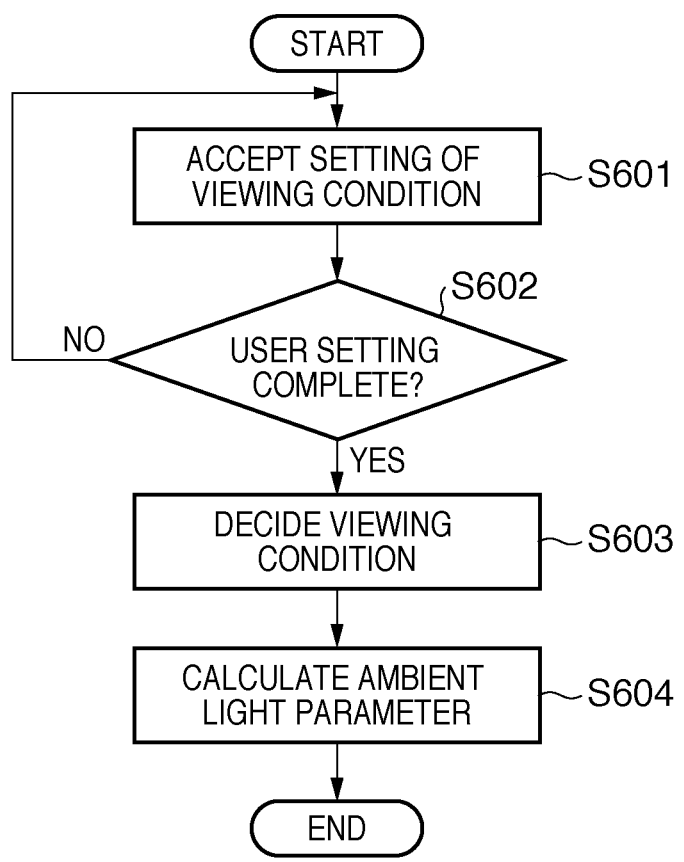
FIG. 6 is a flowchart for explaining the setting of viewing condition.

FIG. 6 is a flowchart for explaining the setting of viewing conditions.

The CPU 101 displays the UI shown in FIG. 4 (and the UI shown in FIG. 5, if necessary) and accepts the settings of the input- and output-side viewing conditions (S601). The CPU 101 accepts the settings of the viewing conditions until the end button 409 is pressed.

When the end button 409 is pressed, the CPU 101 determines that the user setting of ambient light parameters is complete (S602), and decides, from the plurality of set viewing conditions, a viewing condition used to calculate an ambient light parameter (S603). When only one viewing condition is set, it is used to calculate an ambient light parameter. However, when a plurality of viewing conditions are set, a viewing condition used to calculate an ambient light parameter is decided based on a predetermined calculation method. For example, a viewing condition may be decided based on the average value of all of the plurality of set viewing conditions, e.g., the average value or a weighted average value obtained by weighting the viewing condition displayed in the upper portion of the list by a larger weight.

The CPU 101 calculates an ambient light parameter based on the decided viewing condition (S604). For example, assuming that the viewing condition is a color temperature T, and a white point as one ambient light parameter is on a daylight locus, tristimulus values $X_w$, $Y_w$, and $Z_w$ of the white point are calculated by:

$$X_w = 100.0 \cdot x/y$$

$$Y_w = 100.0$$

$$Z_w = 100.0 \cdot (1-x-y)/y \quad (3)$$

where $x = -4.6070 \times 10^9/T^3 + 2.9678 \times 10^6/T^2 + 0.09911 \times 10^3/T + 0.244063$ $$y = -3.000x^2 + 2.870x - 0.275$$

Other ambient light parameters can also be calculated by predetermined methods.

In this manner, the viewing conditions of a plurality of environments in which a printed image or displayed image is likely to be viewed can be set, and an ambient light parameter is decided according to the plurality of viewing conditions so as to perform color processing of the image. Therefore, color processing can be performed such that the image is viewed as a more preferable color in any of the plurality of viewing conditions. In other words, it is possible to suppress the variation in color representation upon viewing an image under a plurality viewing environments having different environment conditions.

Second Embodiment

The color processing of the second embodiment according to the present invention will now be described. Note that the same components as in the first embodiment are denoted by the same reference numerals in the second embodiment, and a detailed description thereof will not be repeated.

The first embodiment has exemplified a case in which the viewing conditions of a plurality of conceivable viewing environments in which an image is viewed are set, and the ambient light parameter decided based on those viewing conditions is used to perform color processing of the image. The second embodiment will exemplify a case in which the range of a viewing condition is set from a plurality of conceivable viewing environments and an ambient light parameter is decided based on it.

Figure 7:
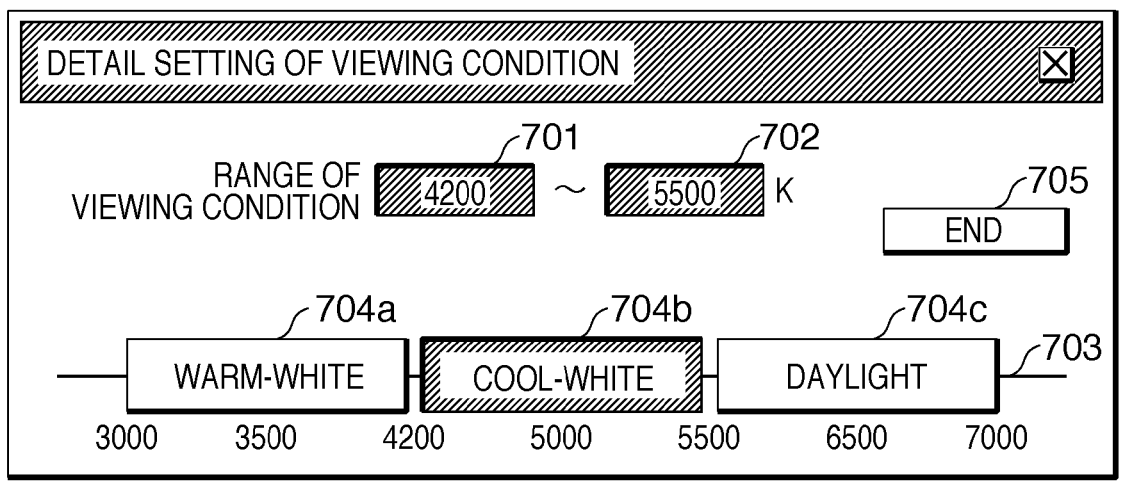
FIG. 7 is a view showing an example of the detail setting window of the color temperature of a viewing condition displayed when a detail setting button is pressed in the second embodiment.

FIG. 7 is a view showing an example of the detail setting window of the color temperature as a viewing condition displayed when a detail setting button 403 or 407 is pressed. In the second embodiment, the viewing conditions of conceivable viewing environments are classified by the representative light source type. The range of a viewing condition is set by presenting the classification information indicating the light source types and allowing a user to select a light source type corresponding to the desired viewing condition. Note that the method, type, and number of classification of the viewing conditions are not particularly limited.

A text box 701 displays the lower limit of the range of the viewing condition (color temperature) corresponding to the selected light source type. A text box 702 displays the upper limit of the range of the viewing condition corresponding to the selected light source type. A display area 703 displays a list of selectable light source types. Select buttons 704a to 704c are used to select a light source. Each button is associated with the corresponding light source type and range of the viewing condition. It is possible to select one or a plurality of select buttons 704a to 704c, and the lower and upper limits of the range of the viewing condition are displayed in the text boxes 701 and 702, respectively, in accordance with the selection result. When the detail setting is complete, the user presses an end button 705.

Figure 8:
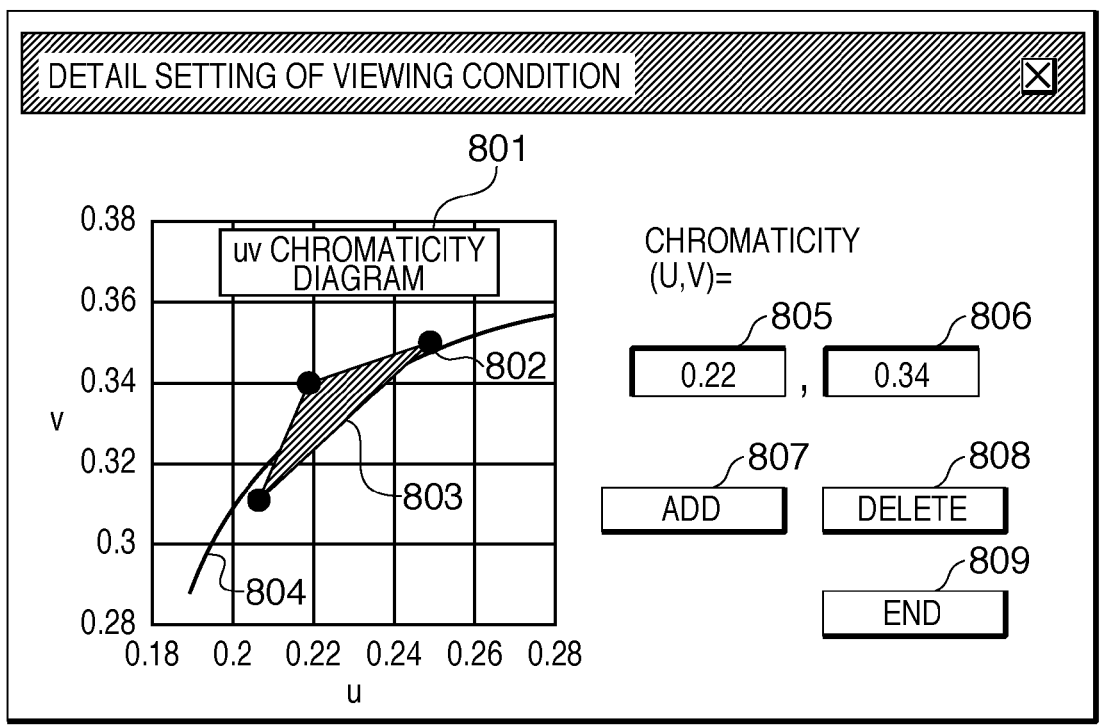
FIG. 8 is a view showing an example of the detail setting window of the chromaticity of a viewing condition displayed when the detail setting button is pressed.

FIG. 8 is a view showing an example of the detail setting window of the chromaticity of a viewing condition displayed when the detail setting button 403 or 407 is pressed. In this embodiment, the range of a viewing condition is set by setting a plurality of chromaticities of the light sources of conceivable viewing conditions.

A chromaticity diagram 801 displays the chromaticity uv value of the set light source as a chromaticity point 802. A curve 804 represents a daylight locus.

The user inputs the u and v coordinate values of a chromaticity in text boxes 805 and 806, respectively, and presses an add button 807 to additionally set the viewing condition. Alternatively, the user selects the chromaticity point 802 from the chromaticity diagram 801 and presses a delete button 808 to delete the viewing condition. When the detail setting is complete, the user presses an end button 809.

FIG. 9 is a flowchart for explaining the setting of viewing condition.

The CPU 101 displays a UI shown in FIG. 4 (and the UI shown in FIG. 7 or 8, if necessary) and accepts the settings of the input- and output-side viewing conditions (S901). The CPU 101 accepts the settings of the viewing conditions until an end button 409 is pressed.

When the end button 409 is pressed, the CPU 101 determines that the user setting of ambient light parameters is complete (S902), and set the range of the viewing condition from the selected light source type or the set chromatic point (S903).

In the example shown in FIG. 7, the range of the color temperature preset for the selected light source type is set as the range of the viewing condition. When a plurality of light source types are selected, their OR product is set as the range of the viewing condition. For example, assume that light source types A, B, and C are selectable and the corresponding ranges of color temperature are $T1 \leq Ta \leq T2$, $T2 \leq Tb \leq T3$, and $T3 \leq Tc \leq T4$, respectively. In this case, when the light source type B is selected, the range of the viewing condition is set to $T2 \leq T \leq T3$. When the light source types A and B are selected, the range of the viewing condition is set to $T1 \leq T \leq T3$.

In the example shown in FIG. 8, the region bounded by a maximum u value umax, a minimum u value umin, a maximum v value vmax, and a minimum v value vmin ($umin \leq u \leq umax$, $vmin \leq v \leq vmax$) of a plurality of set chromaticity points is set as the range of the viewing condition. Alternatively, the region bounded by a plurality of chromaticity points (e.g., a region 803 having three chromaticity points shown in FIG. 8 as its vertexes) may be set as the range of the viewing condition.

Next, the CPU 101 decides a viewing condition used to calculate an ambient light parameter based on the set range of the viewing condition (S904). In the example shown in FIG. 7, when the set range of the viewing condition is $T1 \leq T \leq T2$ and a representative value in that range is Ta, a viewing condition T=Ta, a viewing condition T=(T1+T2)/2, or the like is decided. In the example shown in FIG. 8, an intermediate value is decided as the viewing condition. As an intermediate value, if the range of the viewing condition is expressed by $u1 \leq u \leq u2$ and $v1 \leq v \leq v2$, a point having u=(u1+u2)/2 and v=(v1+v2)/2, a chromaticity point equidistant from all the set chromaticity points, the barycenter of the region 803, or the like can be used.

The CPU 101 calculates an ambient light parameter based on the decided viewing condition (S905). In the example shown in FIG. 7, tristimulus values Xw, Yw, and Zw of a white point are calculated by equation (3) described above. In the example shown in FIG. 8, assuming Yw=100, tristimulus values Xw, Yw, and Zw of a white point are calculated by:

$$Xw = 150 \cdot u/v$$

$$Yw = 100.0$$

$$Zw = (200 - 50u - 500v)/v \qquad (4)$$

Other ambient light parameters can also be calculated by predetermined methods.

In this manner, the range of a viewing condition of environments in which a printed image or displayed image is likely to be viewed can be set, and an ambient light parameter is decided according to the range of the viewing condition so as to perform color processing of the image. Therefore, color processing can be performed such that the image is viewed as a more preferable color in the range of the viewing condition.

Third Embodiment

The color processing of the third embodiment according to the present invention will now be described. Note that the same components as in the first and second embodiments are denoted by the same reference numerals in the third embodiment, and a detailed description thereof will not be repeated.

The first and second embodiments have exemplified a case in which an ambient light parameter is calculated by a predetermined method from a plurality of viewing conditions, light source types, or chromaticity points set by a user. When the user optionally adds adjustment to calculation of an ambient light parameter, it is possible to more flexibly adapt to the viewing condition desired by the user. For example, adjustment according to the frequency of use of the environment in which an image is viewed is conceivable.

Figure 10:
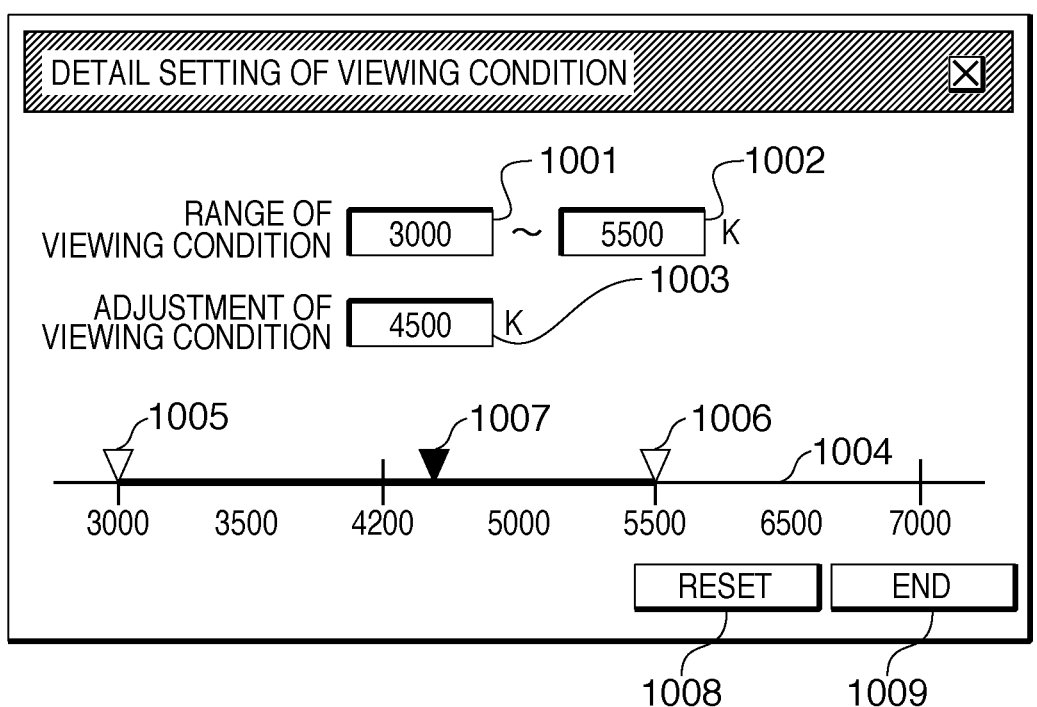
FIG. 10 is a view showing an example of the detail setting window of the color temperature of a viewing condition displayed when a detail setting button is pressed in the third embodiment.

FIG. 10 is a view showing an example of the detail setting window of the color temperature of a viewing condition displayed when a detail setting button 403 or 407 is pressed. A user can directly input a conceivable range of a viewing condition and also adjust the viewing condition used to calculate an ambient light parameter.

The user inputs the lower limit value of the range of the viewing condition (color temperature) in a text box 1001, and inputs the upper limit value of the range of the viewing condition in a text box 1002. In addition, the user inputs, for example, a viewing condition Te which is assumed to be frequently used or a representative viewing condition Te in a text box 1003.

A slider bar 1004 displays the available range of the viewing condition, as well as the input values in the text boxes 1001 to 1003. Markers 1005 and 1006 indicate the input lower and upper limit values of the viewing condition, respectively. A marker 1007 indicates the value Te input in the text box 1003. The user can set the respective viewing conditions by manipulating these markers. A reset button 1008 is used to reset the viewing condition to the initial value (the value initially input by the user). When the detail setting is complete, the user presses an end button 1009.

Figure 11:
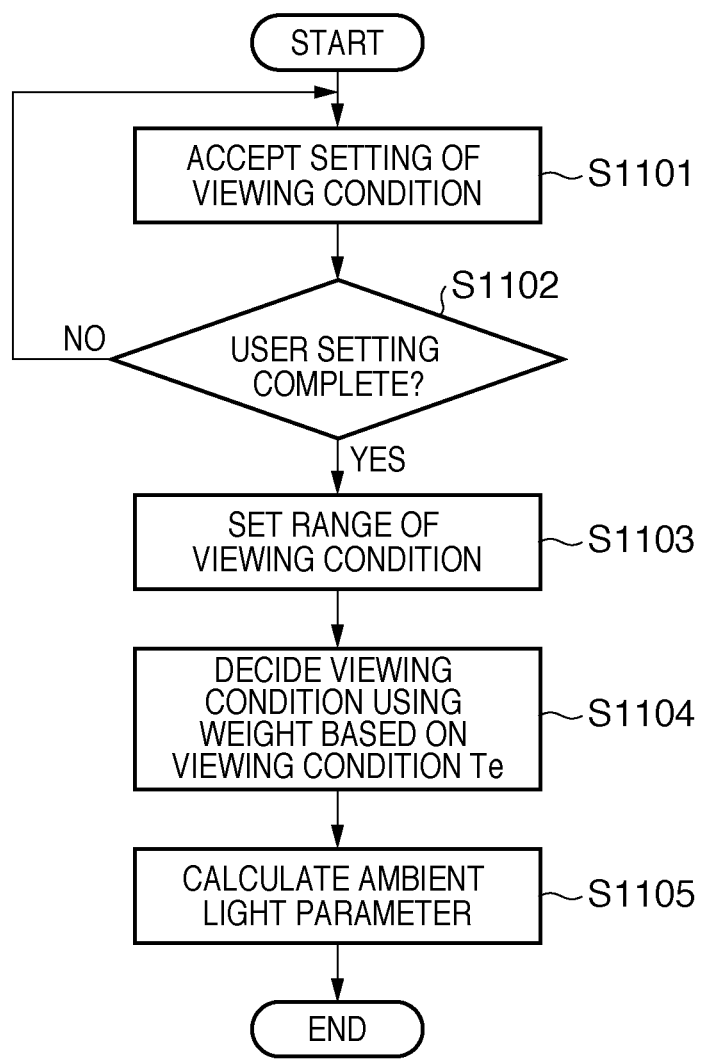
FIG. 11 is a flowchart for explaining the setting of viewing condition.

FIG. 11 is a flowchart for explaining the setting of a viewing condition.

The CPU 101 displays a UI shown in FIG. 4 (and the UI shown in FIG. 10, if necessary), and accepts the settings of the input- and output-side viewing conditions (S1101). The CPU 101 accepts the settings of the viewing conditions until an end button 409 is pressed.

When the end button 409 is pressed, the CPU 101 determines that the user setting of ambient light parameters is complete (S1102), and sets the range of a viewing condition from the input viewing condition (S1103).

The CPU 101 decides the viewing condition used to calculate an ambient light parameter based on the set range of the viewing condition (S1104) by:

$$T = p \cdot T1 + q \cdot T2 \qquad (5)$$

where T1 is the lower limit value
T2 is the upper limit value $$q = (Te - T1)/(T2 - T1)$$

$$p = 1 - q$$

According to equation (5), a viewing condition is decided that is obtained by weighting the viewing condition Te, which is assumed to be frequently used by the user, or the representative viewing condition Te. Calculation of the weight values p and q corresponds to the processing of the adjustment unit 204 shown in FIG. 2.

The CPU 101 calculates an ambient light parameter based on the decided viewing condition (S1105).

In this manner, the range of a viewing condition of environments in which a printed image or displayed image is likely to be viewed and a representative viewing condition can be set, and an ambient light parameter is decided according to the range of the viewing condition and the representative viewing condition so as to perform color processing of the image. Therefore, color processing can be performed such that the image is viewed as a more preferable color in the range of the viewing condition and the representative viewing condition.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-237261, filed Sep. 12, 2007, which is hereby incorporated by reference herein in its entirety.

What is claimed is:

1. A color processing apparatus comprising:
    an inputting section, constructed to input a plurality of viewing conditions of an image at an output destination, wherein the plurality of viewing conditions comprise first and second viewing conditions which indicate a range of viewing conditions, and a third viewing condition which is assumed to be frequently used by a user or is a representative viewing condition of the image at the output destination;
    a setting section, constructed to set a viewing condition to suppress variation in color representation when color data is represented under a plurality of viewing environments corresponding to the range of viewing conditions, wherein the viewing condition is set based on a weighting calculation among the first and second viewing conditions and a weighting of the third viewing condition;
    a calculator, constructed to calculate an ambient light parameter based on the set viewing condition; and
    a color processor, constructed to perform conversion of the color data using the ambient light parameter.

2. The apparatus according to claim 1, wherein the inputting section presents classification information used to input the plurality of viewing conditions.

3. A color processing method comprising the steps of:
    inputting a plurality of viewing conditions of an image at an output destination, wherein the plurality of the viewing conditions comprise first and second viewing conditions which indicate a range of viewing conditions, and a third viewing condition which is assumed to be frequently used by a user or is a representative viewing condition of the image at the output destination;
    setting a viewing condition to suppress variation in color representation when color data is represented under a plurality of viewing environments corresponding to the range of viewing conditions, wherein the viewing condition is set based on a weighting calculation among the first and second viewing conditions and a weighting of the third viewing condition;
    calculating an ambient light parameter based on the set viewing condition; and
    performing conversion of the color data using the ambient light parameter.

4. A non-transitory computer-readable medium storing a computer-executable program for causing a computer to perform a color processing method, comprising the steps of:
    inputting a plurality of viewing conditions of an image at an output destination, wherein the plurality of the viewing conditions comprise first and second viewing conditions which indicate a range of viewing conditions, and a third viewing condition which is assumed to be frequently used by a user or is a representative viewing condition of the image at the output destination;
    setting a viewing condition to suppress variation in color representation when color data is represented under a plurality of viewing environments corresponding to the range of viewing conditions, wherein the viewing condition is set based on a weighting calculation among the first and second viewing conditions and a weighting of the third viewing condition;
    calculating an ambient light parameter based on the set viewing condition; and
    performing conversion of the color data using the ambient light parameter.

* * * * *